(12) United States Patent
Guy et al.

(10) Patent No.: US 6,879,315 B2
(45) Date of Patent: Apr. 12, 2005

(54) FORCE REFLECTING HAPTIC INTERFACE

(75) Inventors: Rodomista Guy, Marlborough, MA (US); Ziegler Andrew, Arlington, MA (US); William A. Goodwin, Brookline, MA (US); Bolton Clive, Andover, MA (US); Thomas H. Massie, Windham, NH (US); R. Michael Lohse, Cambridge, MA (US)

(73) Assignee: SensAble Technologies, Inc., Cambridge, MA (US)

( * ) Notice: Subject to any disclaimer, the term of this patent is extended or adjusted under 35 U.S.C. 154(b) by 0 days.

(21) Appl. No.: 10/144,191

(22) Filed: May 13, 2002

(65) Prior Publication Data

US 2002/0158842 A1 Oct. 31, 2002

Related U.S. Application Data

(62) Division of application No. 09/356,119, filed on Jul. 16, 1999, now Pat. No. 6,417,638.
(60) Provisional application No. 60/093,300, filed on Jul. 17, 1998.

(51) Int. Cl.[7] .................................................. G09G 5/00
(52) U.S. Cl. ........................................ 345/156; 345/179
(58) Field of Search .................................. 318/560–696, 318/138; 33/1 L, 18 T, 504; 414/729; 74/96, 89.22, 469; 901/15.3, 21.42, 23.2, 25.47; 250/231.13; 356/614; 324/162

(56) References Cited

U.S. PATENT DOCUMENTS

| | | |
|---|---|---|
| 3,133,649 A | 5/1964 | Serrell |
| 3,531,868 A | 10/1970 | Stevenson |
| 3,618,742 A | 11/1971 | Blanchard |
| 3,944,798 A | 3/1976 | Eaton |
| 4,477,973 A | 10/1984 | Davies |
| 4,510,574 A | 4/1985 | Guittet et al. |
| 4,521,685 A | 6/1985 | Rebman |
| 4,530,155 A | 7/1985 | Burkhardt et al. |
| 4,593,470 A | 6/1986 | Davies |
| 4,653,011 A | 3/1987 | Iwano |
| 4,654,648 A | 3/1987 | Herrington et al. |
| 4,660,288 A | 4/1987 | Dangschat |
| 4,661,032 A | 4/1987 | Arai |

(Continued)

FOREIGN PATENT DOCUMENTS

| | | |
|---|---|---|
| EP | 0 875 819 | 2/1998 |
| WO | WO/97/06410 | 2/1997 |
| WO | WO/97/12337 | 4/1997 |

(Continued)

OTHER PUBLICATIONS

US 5,903,456, 5/1999, Schena et al. (withdrawn)

" MagicMouse: Tactile and Kinesthetic Feedback in the Human–Computer Interface using an Electromagnetically Actuated Input/ Output Device" A.J. Kelley and S.E. Salcudean, Department of Electrical Engineering University of British Columbia, Vancouver, BC, V6T, 1Z4, Canada, Oct. 19, 1993.

(Continued)

Primary Examiner—Khanh Dang
(74) Attorney, Agent, or Firm—Testa, Hurwitz & Thibeault LLP

(57) ABSTRACT

A six degree of freedom force reflecting haptic interface includes three powered axes and three free axes, all of which are tracked so that the position of a user connection element in the work volume can be determined. The interface includes cable drives with polymer composite or metallic cables, automatic cable tensioning devices, and grounded actuator capstans. A nested hub and transfer drive provide a compact, weight balanced interface. User comfort and safety features are also provided.

18 Claims, 12 Drawing Sheets

U.S. PATENT DOCUMENTS

| | | |
|---|---|---|
| 4,676,002 A | 6/1987 | Slocum |
| 4,702,668 A | 10/1987 | Carlisle et al. |
| 4,769,763 A | 9/1988 | Trieb et al. |
| 4,806,066 A | 2/1989 | Rhodes et al. |
| 4,819,195 A | 4/1989 | Bell et al. |
| 4,837,734 A | 6/1989 | Ichikawa et al. |
| 4,853,874 A | 8/1989 | Iwamoto et al. |
| 4,887,222 A | 12/1989 | Miyake et al. |
| 4,888,877 A | 12/1989 | Enderle et al. |
| 4,945,501 A | 7/1990 | Bell et al. |
| 4,978,846 A | 12/1990 | Buote |
| 4,988,981 A | 1/1991 | Zimmerman et al. |
| 5,018,922 A | 5/1991 | Yoshinada et al. |
| 5,038,089 A | 8/1991 | Szakaly |
| 5,044,956 A | 9/1991 | Behensky et al. |
| 5,053,976 A | 10/1991 | Nose et al. |
| 5,072,361 A | 12/1991 | Davis et al. |
| 5,103,404 A | 4/1992 | McIntosh |
| 5,143,505 A | 9/1992 | Burdea et al. |
| 5,148,377 A | 9/1992 | McDonald |
| 5,177,563 A | 1/1993 | Everett et al. |
| 5,184,319 A | 2/1993 | Kramer |
| 5,194,792 A | 3/1993 | Hara |
| 5,239,246 A | 8/1993 | Kim |
| 5,255,211 A | 10/1993 | Redmond |
| 5,259,120 A | 11/1993 | Chapman et al. |
| 5,264,768 A | 11/1993 | Gregory et al. |
| 5,354,162 A | 10/1994 | Burdea et al. |
| 5,402,582 A | 4/1995 | Raab |
| 5,418,442 A | 5/1995 | Araki |
| 5,459,382 A | 10/1995 | Jacobus et al. |
| 5,482,051 A | 1/1996 | Reddy et al. |
| 5,489,830 A | 2/1996 | Fernandez |
| 5,559,412 A | 9/1996 | Schuler |
| 5,629,594 A | 5/1997 | Jacobus et al. |
| 5,691,898 A | 11/1997 | Rosenberg et al. |
| 5,724,264 A | 3/1998 | Rosenberg et al. |
| 5,734,373 A | 3/1998 | Rosenberg et al. |
| 5,739,811 A | 4/1998 | Rosenberg et al. |
| 5,754,023 A | 5/1998 | Roston et al. |
| 5,769,640 A | 6/1998 | Jacobus et al. |
| 5,802,353 A | 9/1998 | Avila et al. |
| 5,803,738 A | 9/1998 | Latham |
| 5,816,823 A | 10/1998 | Naimark et al. |
| 5,831,408 A | 11/1998 | Jacobus et al. |
| 5,844,392 A | 12/1998 | Peurach et al. |
| 5,847,528 A | 12/1998 | Hui et al. |
| 5,854,843 A | 12/1998 | Jacknin et al. |
| 5,907,229 A | 5/1999 | Snell |
| 5,907,487 A | 5/1999 | Rosenberg et al. |
| 5,910,719 A | 6/1999 | Thorne |
| 5,929,584 A | 7/1999 | Gunnarsson et al. |
| 5,929,607 A | 7/1999 | Rosenberg et al. |
| 5,952,806 A | 9/1999 | Muramatsu |
| 5,956,484 A | 9/1999 | Rosenberg et al. |
| 6,078,876 A | 6/2000 | Rosenberg et al. |
| 6,111,577 A | 8/2000 | Zilles et al. |
| 6,125,337 A | 9/2000 | Rosenberg et al. |
| 6,134,506 A | 10/2000 | Rosenberg et al. |
| 6,184,868 B1 | 2/2001 | Shahoian et al. |
| 6,219,589 B1 | 4/2001 | Faraz et al. |
| 6,239,784 B1 | 5/2001 | Holmes |
| 6,429,846 B2 * | 8/2002 | Rosenberg et al. ......... 345/156 |
| 6,448,977 B1 * | 9/2002 | Braun et al. ............... 345/701 |

FOREIGN PATENT DOCUMENTS

| | | |
|---|---|---|
| WO | WO/97/12357 | 4/1997 |
| WO | WO/97/21160 | 6/1997 |
| WO | WO/97/44775 | 11/1997 |
| WO | WO/98/06024 | 2/1998 |
| WO | WO/98/26342 | 6/1998 |
| WO | WO/98/30951 | 7/1998 |
| WO | WO/98/58308 | 12/1998 |
| WO | WO/98/58323 | 12/1998 |
| WO | WO/99/10872 | 3/1999 |

OTHER PUBLICATIONS

"A System for the Implementation and Kinesthetic Display of Virtual Environments" P. Millman et al.–SPIE– vol. 1833 Telemanipulator Technology, 1992—pp. 49–56.

BioRobotics Lab Home Page, "Mini Direct–Drive Robot," http;//rcs.ee.washington,edu/BRL/devises/mrobot/, 4 pages.

Monash University Home Page, "$2^{nd}$ Asia Pacific Conference on Systems Integrity and Maintenance On–line course Notes and Lecture Presentations," www–mec.eng.monash.edu.au/body.html, 9 pages, Feb. 12, 1999.

NASA MUG Home Page, "Advanced Technology and Mission Studies," http://ranier.hq.nasa.gov/, 11 pages, Dec. 8, 1997.

Robotics Research Group Home Page, "Education Robot Workspace," www.robotics.utexas.edu/rrg/education/low_education/robot_workspaces/main.htm, 14 pages, Sep. 5, 2001.

Y. Adachi, "*Touch and Trace on the Free–Form Surface of Virtual Object,*" Proceedings of IEEE Virtual Reality Annual Interanational Symposium, Sep. 18–22, 1993, Seattle WA, pp. 162–168.

* cited by examiner

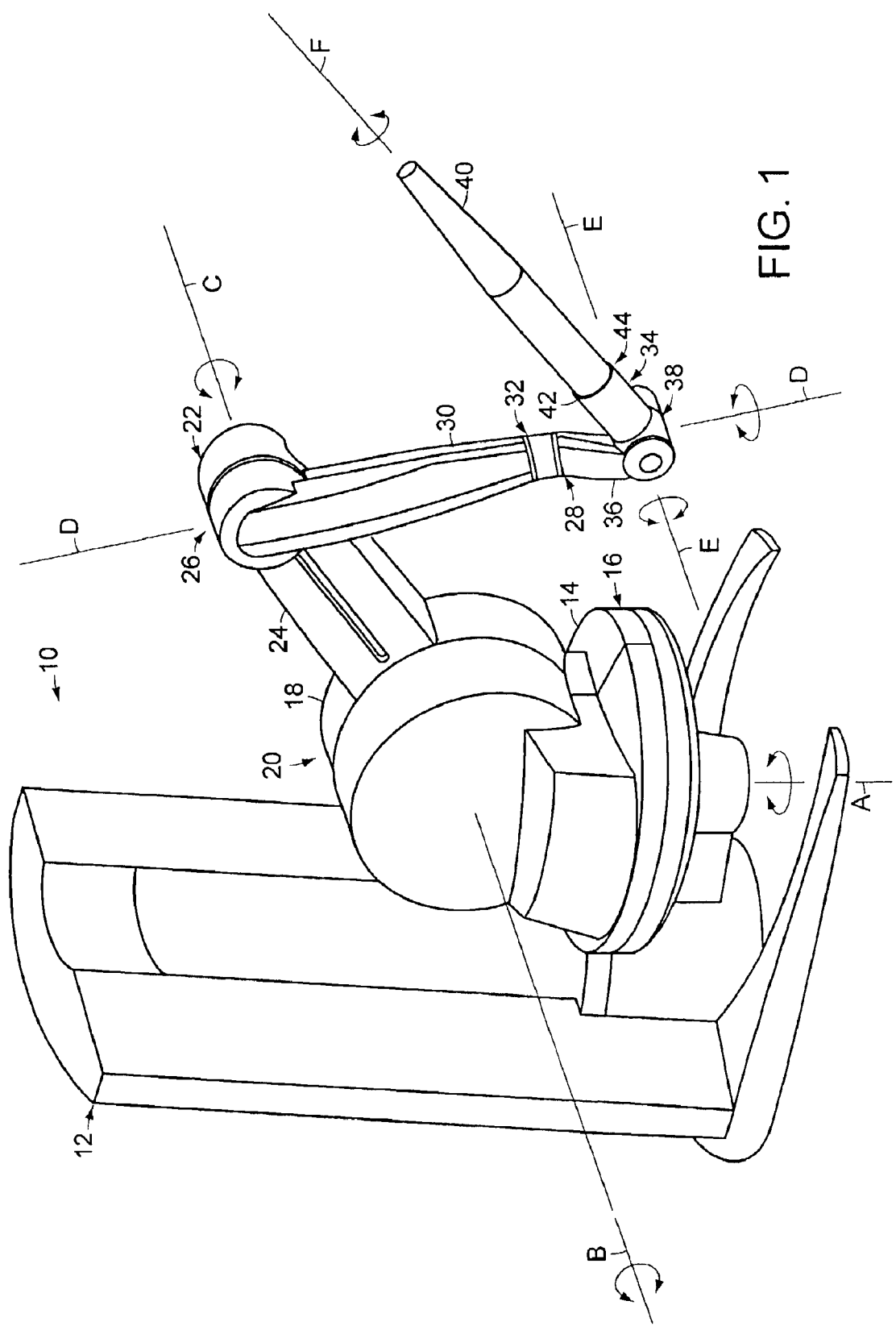

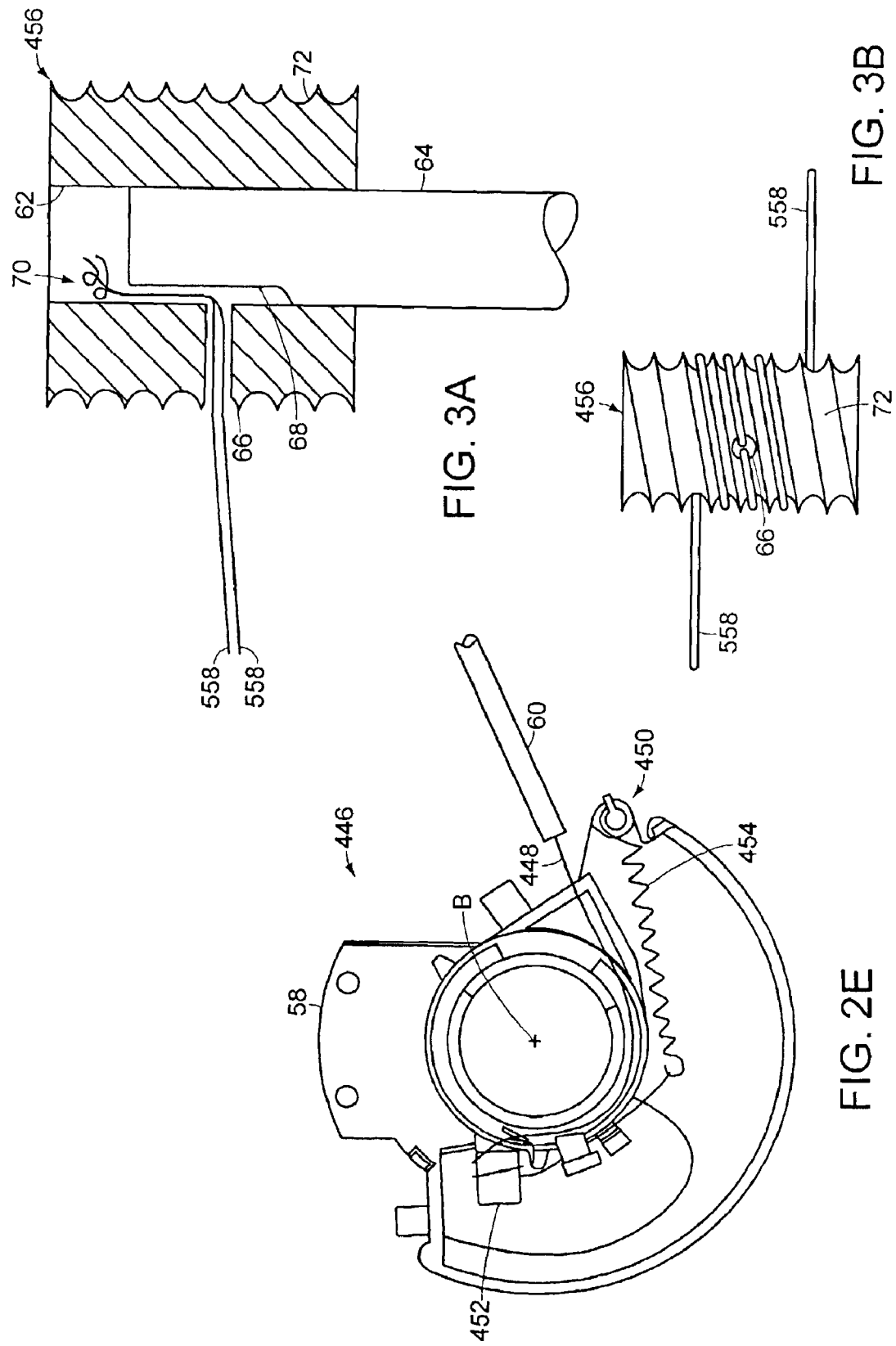

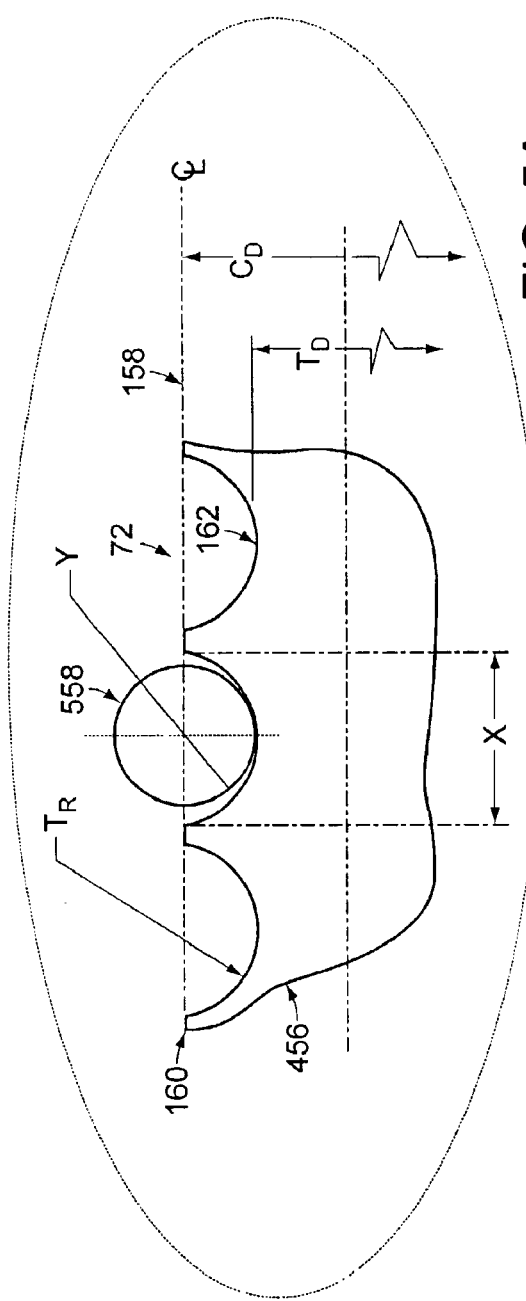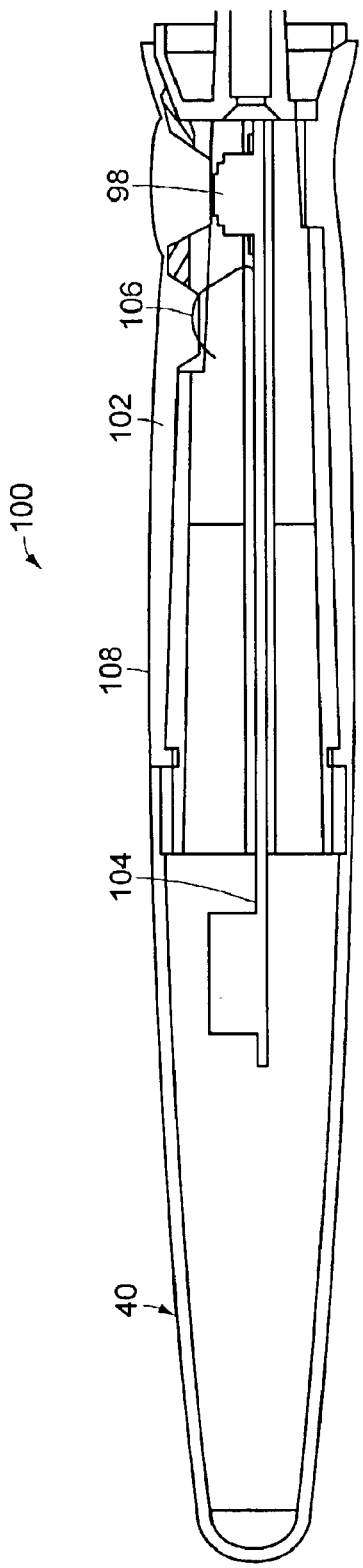

FORCE REFLECTING HAPTIC INTERFACE

CROSS-REFERENCE TO RELATED APPLICATION

This application is a divisional of U.S. patent application Ser. No. 09/356,119, filed Jul. 16, 1999, now U.S. Pat. No. 6,417,638, which claims priority to U.S. provisional patent application Ser. No. 60/093,300 filed on Jul. 17, 1998, the disclosure of which is incorporated herein by reference in its entirety. This application also incorporates herein by reference U.S. patent application Ser. No. 09/356,289, filed Jul. 16, 1999.

TECHNICAL FIELD

The present invention relates generally to a man/machine interface and, more specifically, to a force reflecting haptic interface.

BACKGROUND

Force reflecting haptic interfaces and associated computer hardware and software are used in a variety of systems to provide tactile sensory feedback to a user in addition to conventional visual feedback, thereby affording an enhanced man/machine interface. These systems are becoming more prevalent in such diverse areas as surgical technique training, is industrial design and modeling, and personal entertainment.

An example of a haptic interface for use in a desktop environment is disclosed in U.S. Pat. No. 5,587,937 issued to Massie et al., the disclosure of which is herein incorporated by reference. Briefly, the disclosed haptic interface defines a user reference point located, for example, proximate or within a volume of a user connection element such as a finger thimble or stylus configured to be donned or grasped by a user. Disposed between the user connection element and a spatial or reference ground are a series of mechanical transmission elements such as gimbals, linkages, and frames configured to permit substantially unrestricted movement of the connection element within a predetermined work volume of the haptic interface when in an unpowered state.

Based on the configuration and orientation of the transmission elements, multiple independent degrees of freedom may be provided. Depending on the particular application for the interface, each degree of freedom may be either powered and/or tracked, or free, being neither powered nor tracked. For example, a degree of freedom may be powered by a motor or other actuator so that, under appropriate conditions, the interface can resist, balance, or overcome a user input force along that degree of freedom. The powered axis may be active, with force being varied as a function of system conditions, or passive, such as when a constant resistance or drag force is applied. Alternatively or additionally, a degree of freedom can be tracked using an encoder, potentiometer, or other measurement device so that, in combination with other tracked degrees of freedom, the spatial location of the reference point within the work volume can be determined relative to ground. Lastly, a degree of freedom may be free, such that a user is free to move along the degree of freedom substantially without restriction and without tracking within the limits of the range of motion. The interface, in combination with appropriate computer hardware and software, can be used to provide haptic feedback in a virtual reality environment or link a user to an actual manipulator located, for example, in a remote or hazardous environment.

Significant challenges exist in designing a force reflecting haptic interface with appropriate operational and response characteristics. For example, it is desirable that the haptic interface have low friction and weight balance such that a user's movements will not be unduly resisted and the user will not become fatigued merely by moving the connection element within the work volume. It is also desirable that the haptic interface have a high degree of resolution and be highly responsive so as to replicate, as closely as possible, an actual haptic experience. Reliability, compact size, low cost, and simplicity of design for ease of manufacture and repair also are beneficial attributes from the standpoint of commercial acceptance and appeal.

SUMMARY OF THE INVENTION

In one embodiment, a six degree of freedom force reflecting haptic interface includes a housing defining a reference ground and six structural elements connected by six joints or articulations. A first powered tracked rotary element is supported by the housing to define a first articulation with an axis having a substantially vertical orientation. A second powered tracked rotary element is mounted thereon to define a second articulation with an axis having a substantially perpendicular orientation relative to the first axis. A third powered tracked rotary element is mounted on a generally outwardly radially disposed extension of the second element to define a third articulation having an axis which is substantially parallel to the second axis. A fourth free rotary element is mounted on a generally outwardly radially disposed extension of the third element to define a fourth articulation having an axis which is substantially perpendicular to the third axis. A fifth free rotary element is mounted on a generally outwardly radially disposed extension of the fourth element to define a fifth articulation having an axis which is substantially perpendicular to the fourth axis. Lastly, a sixth free rotary user connection element in the form of a stylus configured to be grasped by a user is mounted on a generally outwardly radially disposed extension of the fifth element to define a sixth articulation having an axis which is substantially perpendicular to the fifth axis.

Three actuators and cable drives are utilized in the interface to power the first, second, and third rotary axes. Each of the cable drives includes at least one automatic cable tensioning device for preventing backlash and a grounded or ungrounded actuator capstan to prevent slippage of each cable relative to its respective actuator capstan. Cable drives on the first and second axes include cables manufactured from a braided tungsten or polymer composition including a fused blend of high modulus polyethylene fibers and liquid crystal aromatic polyester-polyarylate fibers which exhibit low creep, high strength, and long life. The third axis drive includes a braided tungsten or polymer composition cable to drive a transfer element and first and second metal cables driven by the transfer element to power the third axis. Each metal cable has a centrally disposed aluminum or stainless steel rod, or other suitably rigid member, and looped stranded stainless steel or braided tungsten cable ends. In combination, the components of the third axis drive provide high stiffness and prevent backlash in a remotely actuated, cantilevered drive.

The actuator for the third articulation is disposed remotely, proximate the actuator for the second articulation in the hub thereof, to minimize the size and the weight of the third articulation. Accordingly, the second articulation hub is configured with two hubs nested on a common axis, namely the second axis.

In one embodiment, the three powered axes are also the three tracked axes of the haptic interface. In order to minimize the structural envelope of the haptic interface and maintain high resolution, an optical encoder is mounted on each of the three actuators proximate each capstan. Alternatively, actuators with integral encoders could be employed.

The haptic interface may also include automatic work volume calibration components for use in combination with computer software such that the haptic system, as a whole, has the capability to initialize position of the haptic interface and geometrically center the user reference point in both the workspace volume and virtual or remote environment.

Several other features may be provided in the haptic interface to enhance user safety and comfort. For example, a presence switch may be provided in the user connection element to indicate when the stylus is being grasped by a user. Alternatively or additionally, velocity limits may be provided for each of the powered axes to limit the speed of the axes. Lastly, a wrist rest or other structure may be provided to support a user's wrist and/or arm at a predetermined or adjustable height and orientation to address ergonomic concerns with prolonged or extended use of the haptic interface.

BRIEF DESCRIPTION OF THE DRAWINGS

The invention, in accordance with preferred and exemplary embodiments, together with further advantages thereof, is more particularly described in the following detailed description taken in conjunction with the accompanying drawings in which:

FIG. 1 is a schematic perspective view of a force reflecting haptic interface in accordance with one embodiment of the present invention;

FIG. 2E is a schematic plan view of a second automatic cable tensioning device employed on a reverse side of the transfer drive element of the first automatic cable tensioning device depicted in FIG. 2D to drive the third articulation of the haptic interface;

FIG. 3A is a schematic cross-sectional view of a grounded actuator capstan for use in the cable drives of the haptic interface in accordance with an embodiment of the present invention;

FIG. 3B is a schematic side view of the grounded actuator capstan depicted in FIG. 3A;

FIG. 5A is an enlarged schematic view of a portion of the cable drive capstan depicted in FIG. 5 for use in the haptic interface in accordance with an embodiment of the present invention;

FIG. 6 is a schematic cross-sectional view of a presence switch integrated into the user connection stylus element of the haptic interface in accordance with an embodiment of the present invention;

DETAILED DESCRIPTION

Figure 2A:
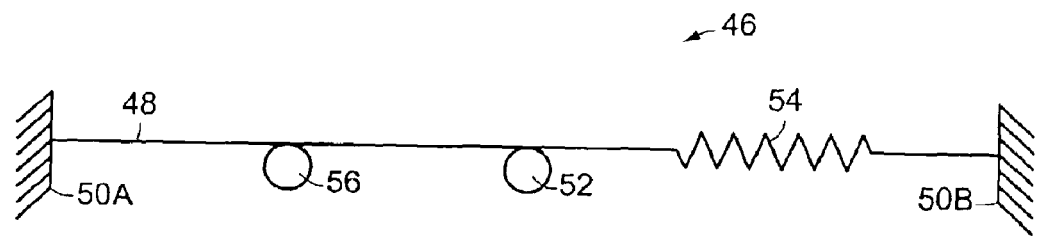
FIG. 2A is a schematic view of an automatic cable tensioning device useful in the haptic interface in accordance with one embodiment of the present invention.

FIG. 1 is a schematic perspective view of a six degree of freedom force reflecting haptic interface 10 in accordance with one embodiment of the present invention. The interface 10 includes a housing 12 defining a reference ground, six joints or articulations, and six structural elements. A first powered tracked rotary element 14 is supported by the housing 12 to define a first articulation 16 with an axis "A" having a substantially vertical orientation. A second powered tracked rotary element 18 is mounted thereon to define a second articulation 20 with an axis "B" having a substantially perpendicular orientation relative to the first axis, A. A third powered tracked rotary element 22 is mounted on a generally outwardly radially disposed extension 24 of the second element 18 to define a third articulation 26 having an axis "C" which is substantially parallel to the second axis, B. A fourth free rotary element 28 is mounted on a generally outwardly radially disposed extension 30 of the third element 22 to define a fourth articulation 32 having an axis "D" which is substantially perpendicular to the third axis, C. A fifth free rotary element 34 is mounted on a generally outwardly radially disposed extension 36 of the fourth element 28 to define a fifth articulation 38 having an axis "E" which is substantially perpendicular to the fourth axis, D. Lastly, a sixth free rotary user connection element 40 in the form of a stylus configured to be grasped by a user is mounted on a generally outwardly radially disposed extension 42 of the fifth element 34 to define a sixth articulation 44 having an axis "F" which is substantially perpendicular to the fifth axis, E.

Instead of using mechanical linkages, gears, or other force transmission components, the interface 10 employs three dedicated actuators fitted with capstans and corresponding cables to power rotary axes A–C. Cable drives provide good force transmission characteristics with low weight; however, backlash can be a problem, especially in high precision, high resolution haptic interfaces. Backlash or play in a rotary mechanical transmission, such as those employed in the interface 10, is most evident when direction of rotation is reversed. One method of reducing backlash is to provide a manual adjustment feature to adjust the position of one or both of the cable ends relative to ground so that slack in the cable can be reduced. Further, the cable can be preloaded in tension so that there is minimal slippage between the cable and the actuator capstan as the capstan rotates. However, as the cable stretches and the components of the mechanism wear over time, cable tension is reduced and must be periodically adjusted to prevent slippage. Additionally, cable tension is difficult to measure and excessive tensioning can lead to deformation of the structural elements and accelerated, premature wear in the articulation bearings.

FIG. 2A is a schematic view of an automatic cable tensioning device 46 which overcomes many of the limitations of known cable drives and is useful in the powered axes of the haptic interface 10 in accordance with one embodiment of the present invention. The tensioning device 46 automatically loads the cable to a predetermined tension and maintains that level of tension over time, even in the event of cable stretching and component wear. The tensioning device 46 includes a cable 48 fixed at proximal and distal ends directly or indirectly to a ground surface, shown generally at 50a, 50b. A non-rotating clutch post 52, also fixed to ground, is located along the cable path. A spring 54 is disposed along the cable path between the clutch post 52 and ground 50b. Lastly, an actuator capstan 56 is provided along the cable path between the clutch post 52 and ground 50a on the side opposite the spring 54. As depicted in FIG. 2A, the cable 48 extends from ground 50a, circumscribes both the actuator capstan 56 and the clutch post 52 at least once each, and is connected to the spring 54, which is in tension and connected to ground 50b.

A non-rotating post, such as clutch post 52, may be used to amplify or multiply an applied cable tension to resist or offset tension applied to the cable downstream of the post. As is known by those skilled in the art, the amplification factor is a function of post diameter, wrap angle of the cable around the post, and the coefficient of friction between the cable and the post. Accordingly, for a given spring tension, as wrap angle and/or friction increases, a larger downstream cable forces can be offset or resisted.

In a static state, the tension induced in the cable 48 by the spring 54 causes the cable to be pulled to the right, eliminating any slack or looseness in the cable 48, cable tension being a function of the spring constant, k, and the linear displacement, x, of the spring ends from a rest state. In operation, as the actuator capstan 56 rotates in a clockwise direction, as depicted, tension is applied to the portion of the cable 48 between the capstan 56 and ground 50a and the capstan 56 moves to the left relative to ground 50a. Any looseness or slack in the cable to the right of the capstan 56 is automatically taken up by the spring 54, the cable 48 sliding around the clutch post 52 whenever the spring force overcomes the frictional drag of the cable 48 around the clutch post 52.

Alternatively, when the capstan 56 rotates in a counterclockwise direction, the capstan 56 applies tension to the cable portion between the capstan 56 and the clutch post 52. As long as the spring tension enhanced by the clutch post effect exceeds the tension induced by the capstan 56, the cable 48 will be effectively locked 48 to the clutch post 52 and will not slip around the post 52. The spring 46 will be effectively isolated from the capstan loading. Accordingly, the tensioning device 46 automatically self-adjusts and maintains cable tension at a predetermined magnitude, taking up any slack when the capstan 56 rotates in a first direction and locking when the capstan 56 rotates in a second direction.

Figure 2B:
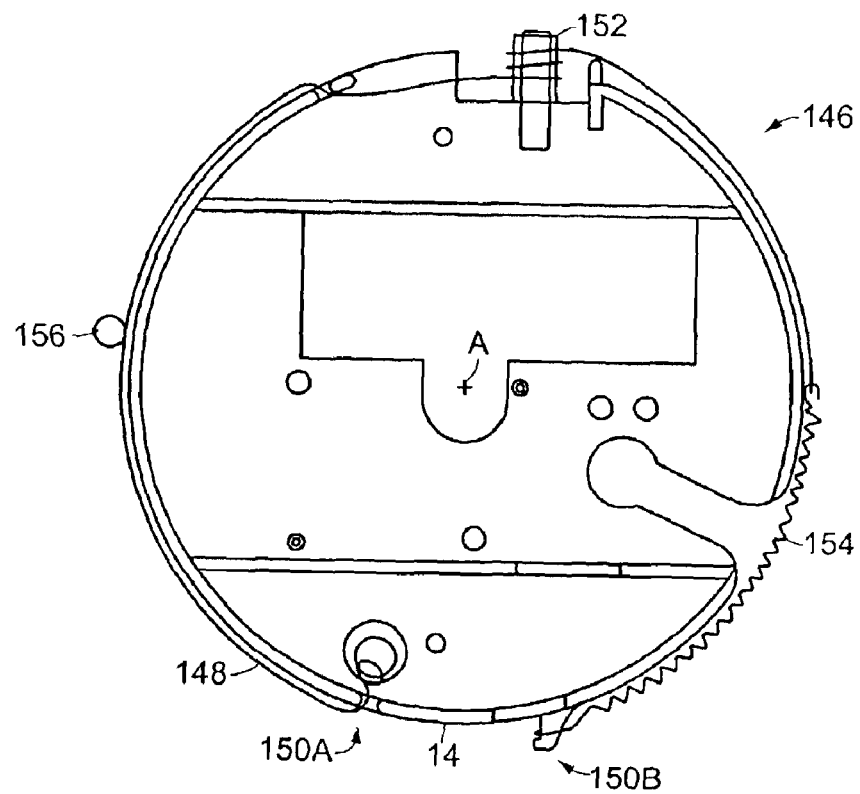
FIG. 2B is a schematic plan view of the automatic cable tensioning device employed to drive the first articulation of the haptic interface in accordance with one embodiment of the present invention.

FIGS. 2B–2E depict several applications of the principles of the tensioning device 46 in the powered axes of the haptic interface 10. For example, FIG. 2B is a schematic plan view of an automatic cable tensioning device 146 employed in the first articulation 16 of the haptic interface 10. Depicted is a generally circular hub portion of the first element 14. A cable 148 is fixed to the element 14 at a first ground location 150a and circumscribes the element 14 in a clockwise direction. The cable 148 wraps an actuator capstan 156 disposed substantially tangentially to the circumference before wrapping several times around a clutch post 152. Thereafter, the cable is attached to a spring 154 in tension which is grounded to the element 14 at 150b. Since the actuator (not depicted) is fixed in the housing 12 of the interface 10, as the actuator rotates the capstan 156, the first element 14 is caused to rotate about first axis A. As may be readily seen, tabs, slots, and other guide features are provided in the element 14 to facilitate routing and retention of the cable 148 in the proper location and orientation throughout the range of motion of the element 14.

Figure 2C:
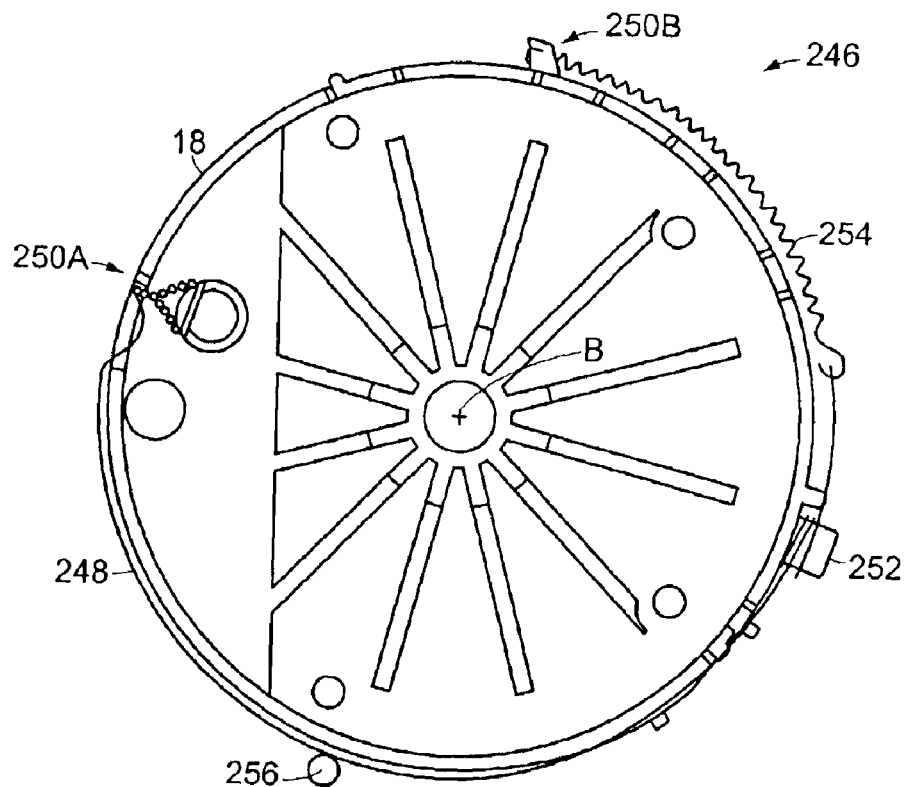
FIG. 2C is a schematic plan view of the automatic cable tensioning device employed to drive the second articulation of the haptic interface in accordance with one embodiment of the present invention.

FIG. 2C is a schematic plan view of an automatic cable tensioning device 246 employed in the second articulation 20 of the haptic interface 10. Depicted is a generally circular hub portion of the second element 18. A cable 248 is fixed to the element 18 at a first ground location 250a and circumscribes the element 18 in a counterclockwise direction. The cable 248 wraps an actuator capstan 256 disposed substantially tangentially to the circumference before wrapping several times around a clutch post 252. Thereafter, the cable is attached to a spring 254 in tension which is grounded to the element 18 at 250b. Since the actuator (not depicted) is fixed to the first element 14, as the actuator rotates the capstan 256, the second element 18 is caused to rotate about the second axis B.

Figure 2D:
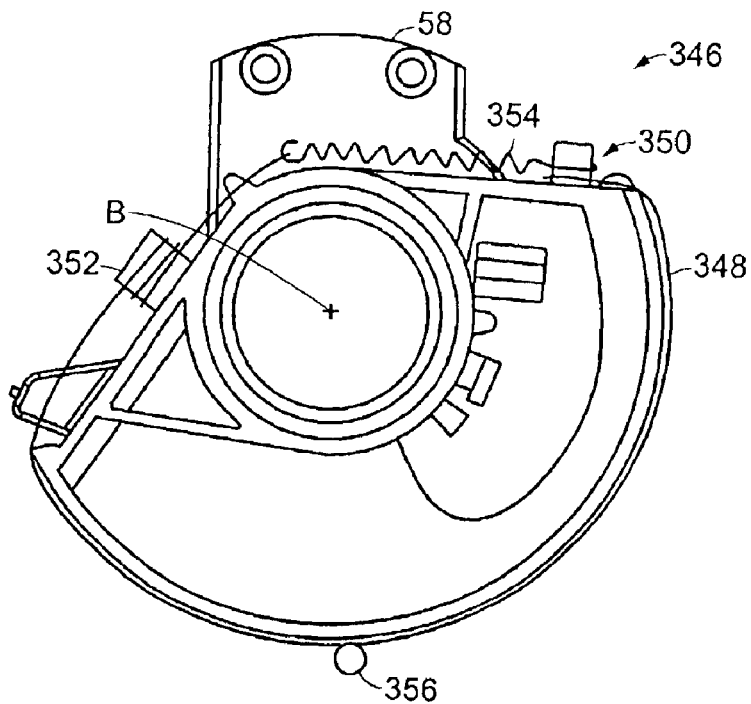
FIG. 2D is a schematic plan view of a first automatic cable tensioning device employed to drive a transfer drive element of the third articulation of the haptic interface in accordance with one embodiment of the present invention.
Figure 4A:
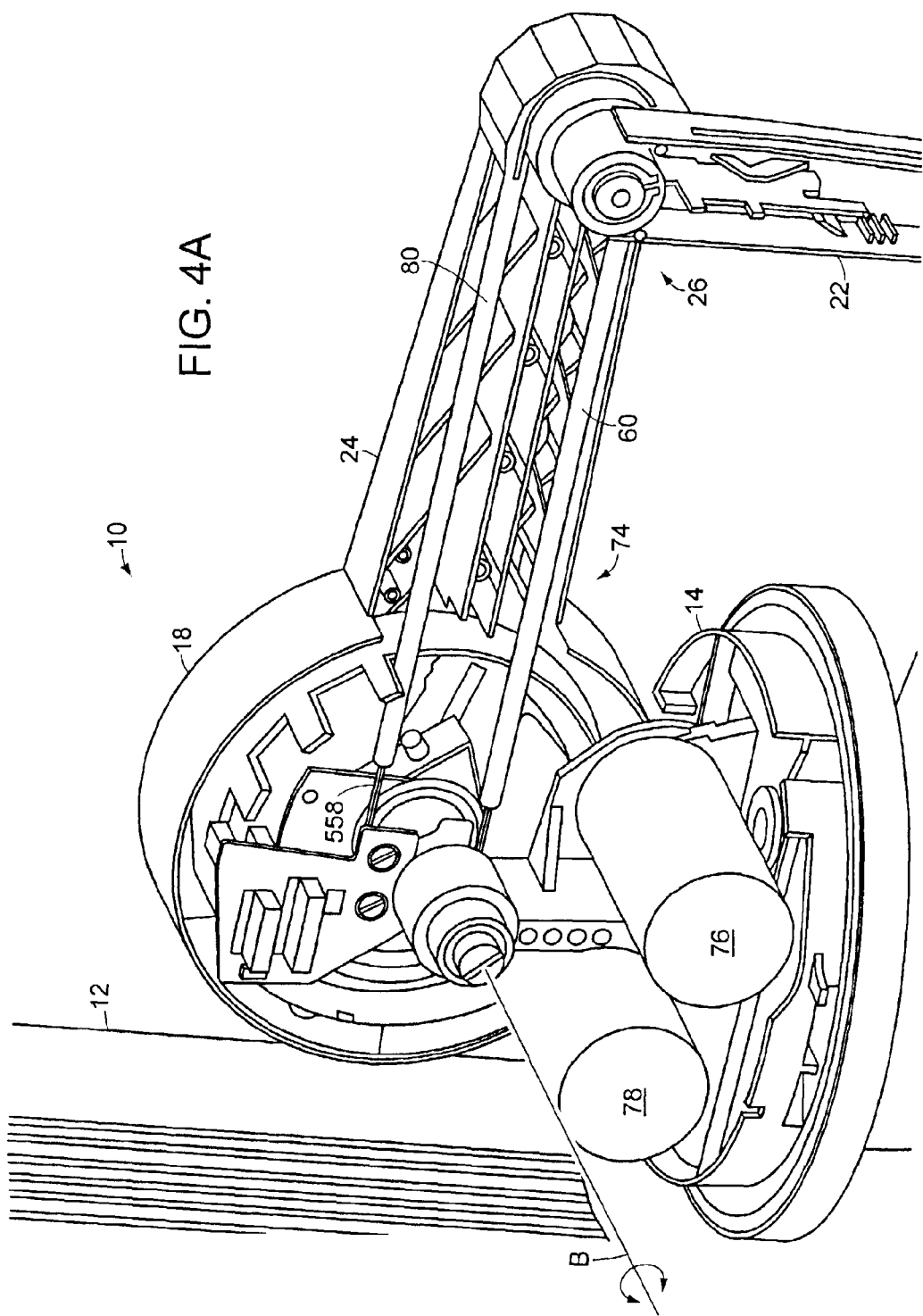
FIG. 4A is a schematic perspective view of a transfer drive for powering the third articulation of the haptic interface in accordance with one embodiment of the present invention.
Figure 4B:
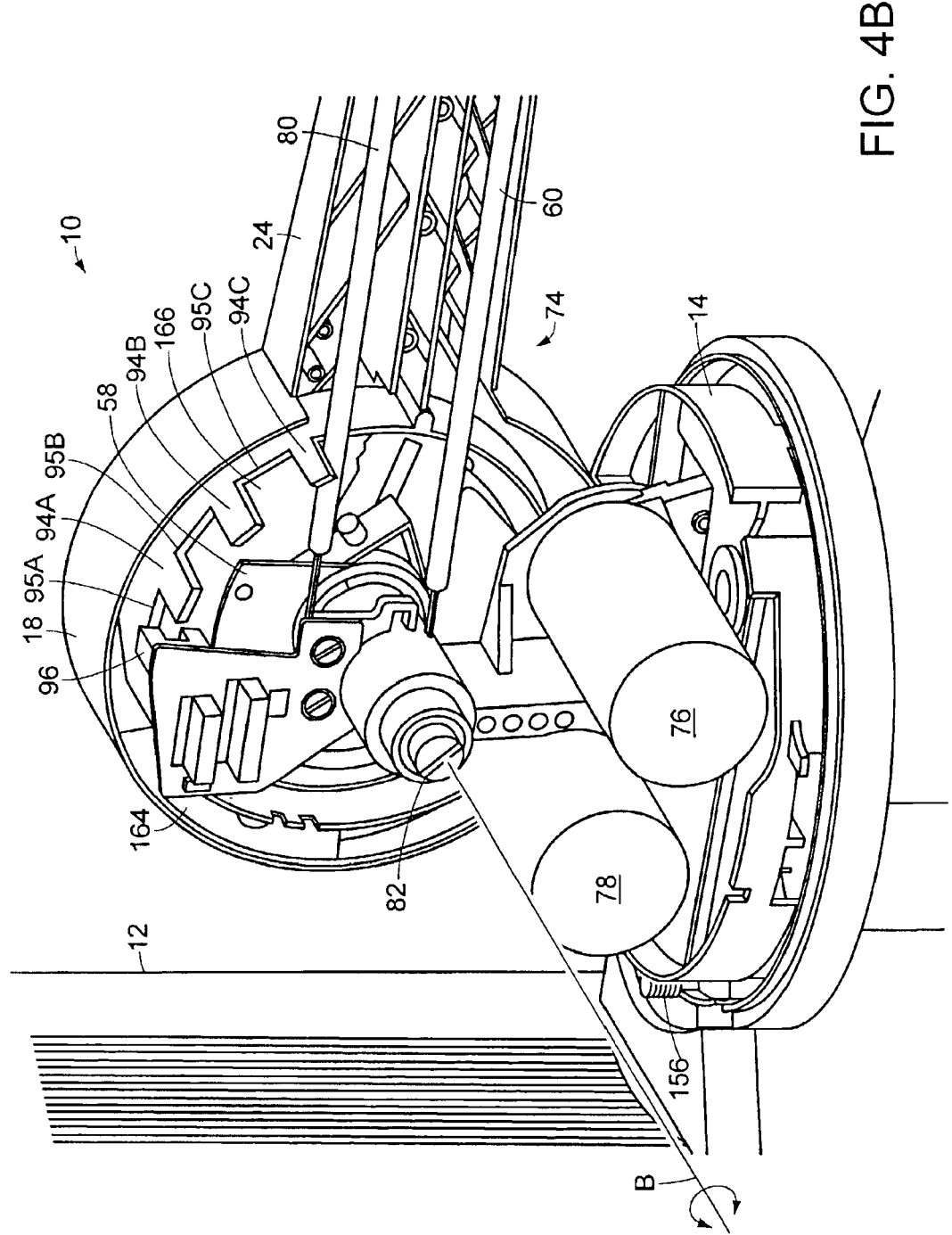
FIG. 4B is a schematic enlarged perspective view of a portion of the transfer drive depicted in FIG. 4A.

FIG. 2D is a schematic plan view of a first automatic cable tensioning device 346 employed to drive a transfer drive element 58 of the third articulation 26 of the haptic interface 10. Referring first to FIGS. 1 and 4A–4B, the cable drive transmission for the third articulation 26 spans a distance from the hub of the second element 18, along the extension 24 thereof, to a hub of the third element 22. As mentioned hereinabove, the actuator for the third articulation 26 is disposed remotely, proximate the actuator for the second articulation 20 in the hub thereof, to minimize the size and the weight of the cantilevered third articulation 26. Accordingly, the second articulation hub is configured with two rotatable components nested on a common axis, namely the second axis, B, as will be discussed in greater detail hereinbelow.

Referring once again to FIG. 2D, the transfer drive element 58 is journaled for rotation about the second axis B. A cable 348 is fixed to the element 58 at a ground location 350 and circumscribes the element 58 in a clockwise direction. The cable 348 wraps an actuator capstan 356 disposed substantially tangentially to the circumference before wrapping several times around a clutch post 352. Thereafter, the cable is attached to a spring 354 in tension which is grounded to the element 58 at 250. Since the actuator (not depicted) is fixed to the first element 14, as the actuator rotates the capstan 356, the transfer drive element 58 is caused to rotate about second axis B.

A reverse side of the transfer drive element 58 is depicted in FIG. 2E and employs a second automatic cable tensioning device 446 for transferring the rotation of the drive element located in the hub of the second element 18 to the third articulation 26. A first rigid transfer drive rod 60 grounded to the third element 22 is crimped or otherwise attached to a tungsten or stainless steel cable 448 proximate the drive element 58. The cable 448 circumscribes a central hub of the drive element 58 in a clockwise direction. The cable 448 wraps several times around a clutch post 452 before being attached to a spring 454 in tension which is grounded to the element 58 at 450. As the actuator rotates the transfer drive element 58 about axis B, as discussed with respect to FIG. 2D hereinabove, the rotational motion of the drive element 58 is transformed into linear motion of the transfer drive rod 60. A second transfer drive rod grounded between the transfer drive element 58 and the third element 22 completes the third axis drive, as will be discussed in greater detail hereinbelow.

Instead of simply wrapping a cable around an actuator capstan one or more times and providing tension to the cable to reduce the likelihood of slippage, the cable may be positively grounded to the capstan to ensure there is no slippage relative thereto. FIG. 3A is a schematic cross-sectional view of a grounded actuator capstan 456 for use in the cable drives of the haptic interface 10 in accordance with an embodiment of the present invention. The grounded capstan 456 may be used with conventional cable drives or advantageously with the automatic cable tensioning device 46.

The generally cylindrical capstan 456 forms a centrally disposed bore 62 sized to receive an actuator shaft 64. The capstan 456 may be secured to the shaft 64 by bonding, mechanical fastening, or any other suitable method. A keyway, spline, or other anti-rotation feature may also be provided, if desired. A generally centrally radially disposed aperture 66 is provided in the capstan 456, the aperture 66 sized to permit passage therethrough of a double portion of a drive cable 558. The shaft may be D-shaped or have a flat or groove formed therein as shown generally at 68.

At assembly, two lengths of cable 558 are passed through the aperture 66 in the capstan 456 and knotted together as shown generally at 70. Used herein, knotting refers to the process of forming a bulge in a length of cable. This may be achieved by tying the two lengths together or by using a device which crimps the two lengths together in a bead. In the former method, the knot is formed by the cables themselves and in the latter case, the knot is effectively the bead which holds the two cables together. Alternatively, a single length of cable can be doubled over, passed through the aperture 66, and knotted. In either case, the knotting 70 is provided to prevent the cable 558 from being pulled back through the aperture 66. An adhesive may be applied to the knotting 70 to prevent unraveling, if desired. As the capstan 456 is being mounted on the actuator shaft 64, the aperture 66 is aligned with the shaft flat 68, generally as depicted, to positively capture the knotted portion 70 without severing the cable 558. Thereafter, the individual free ends of the cable may be wrapped in opposite directions around the capstan 456, as depicted in FIG. 3B, and routed as desired. For example, one free end may be attached to ground and the other wrapped around a clutch post before being attached to a spring which is in turn attached to ground.

While the capstan 456 may be a uniform cylinder, in one embodiment, the capstan 456 includes a helical channel 72 formed along an exterior surface thereof. The cable aperture 66 is aligned with a valley of the channel 72 so that both portions of the cable 558 exiting the aperture 66 can be smoothly wrapped around the capstan 456. The opening of the aperture 66 may include a generous radius to blend the aperture 66 with the helical channel 72 without sharp edges which could cut through the cable 558 or otherwise reduce the life thereof. The helical channel 72 nests and routes the cable 55 8, preventing overlapping or tangling of the cable 558 on the capstan 456.

An enlarged portion of a capstan 456 with a helical channel 72 is depicted in FIG. 5A. The capstan 456 has a trough diameter $T_D$ and a crest diameter $C_D$ measured from a centerline of the capstan 456, and a trough radius $T_R$. In one embodiment; $T_D$ equals 0.175 inches, $C_D$ equals 0.189 inches, and $T_R$ equals 0.010 inches; however, $T_D$, $C_D$, and $T_R$ may be sized, as necessary, depending on the geometry of the cable. The helical channel 72 shown is a right hand thread with a 0.0227 pitch (i.e., 44 threads per inch); however, the capstan 456 may have a left hand thread and the thread pitch may be varied as necessary. The radial height of the channel 72 between the trough to the crest (i.e., $C_D - T_D$) is about equal to the radius of the cable 558, and the trough radial contour 162 is up to about 50 percent greater than the radius of the cable 558.

In one embodiment of a capstan, such as that shown in FIG. 5A, the helical channel 72 has a uniform radius ($T_R$) for nesting and routing the cable 558. The channel 72 could be V-shaped; however, the U-shape of a channel 72 with a uniform radius is believed to support the cable better and enhance useful cable life. The centerline 158 of the cable 558 should be approximately aligned with the crest 160 of the channel 72. The crest to crest distance (X) should be greater than the cable 558 diameter (Y) by up to about 50 percent. For example, a channel 72 with a trough radius of 0.010 inches nesting a cable with a diameter (Y) of 0.014 inches yields an X dimension 42 percent greater than the cable diameter (Y). Accordingly, at increased loads, the cable may deform slightly and increase surface contact between the cable and the channel. The increased surface contact may obviate the need for a grounded capstan, in which case, the aperture 66 would not be required. In conventional capstans and sheaves, trough radius $T_R$ is no more than about 5% to 10% greater than the radius of the cable.

Instead of providing a flat 68 on the actuator shaft 64, a groove may be formed in the capstan bore 62. Also, instead of capturing the knot 70 inside the bore 62, a window or other cutout may be provided in the capstan 456 longitudinally spaced from the aperture 66 to provide space for the knot.

In order to reduce the cost and size of a cable drive in the haptic interface 10 while maintaining the desired force reflecting characteristics, it is desirable to use relatively small actuators and capstans to generate the desired torques and forces. Cables which undergo repeated and severe bending around small diameter capstans or clutch posts, however, must have a high degree of flexibility to prevent premature fraying, breakage, and failure due to fatigue, picking, or other failure mechanisms. For example, conventional steel cables typically require a capstan diameter to cable diameter ratio of about 15 to 50 or more, depending on the diameter of the individual steel fibers used to manufacture the cable and the construction of the cable. While cable tension can be increased to prevent slippage when using insufficiently flexible cables with smaller than recommended capstan diameters, such actions tend merely to accelerate degradation and failure of the cable.

In additional to flexibility, parameters such as yield strength, elastic modulus, and creep characteristics are important in selecting a cable for use in a haptic interface 10. Creep, as opposed to elastic stretching, is the relatively slow, permanent plastic deformation of the cable which results from continued exposure to elevated levels of stress. For many materials, creep is exacerbated at increased temperatures. A cable with poor creep strength characteristics will permanently stretch and loosen over time, absent manual or automatic tension compensation.

The polymer composition cables which can be used in the first and second axis drives and a portion of the third axis transfer drive may be a fused blend of a high modulus polyethylene (HMPE) material and a liquid crystal aromatic polyester-polyarylate (LCAP) material which, in combination, has been shown to exhibit low creep, high strength, and long life.

Commercially available gel spun HMPE material in filament, fiber, and yarn forms, such as that manufactured by DSM, N.V. located in the Netherlands and sold under the marks Dyneema™ or Fireline™, has a high elastic modulus, but is relatively inflexible and exhibits excessive creep. Accordingly, performance of a cable manufactured solely from this material is compromised when subjected to bending around small diameters or loading over time.

Alternatively, commercially available LCAP material in similar forms, such as that manufactured by Hoechst Celanese, a division of Hoechst AG located in the Netherlands, and sold under the mark Vectran™, exhibits low creep, but is relatively brittle and prematurely frays after repeated cycling, making a cable manufactured solely from this material generally unsuitable for use in the cable drives discussed hereinabove.

A polymer composition cable suitable for use in the haptic interface cable drives can be manufactured by twisting or braiding together filaments, fibers, or yarns of HMPE and LCAP and subjecting the composite cable to an elevated temperature in the range of the respective melting points of the two materials for a period of time to at least partially fuse the two materials together. The heated composite cable may also be drawn under tension while at the elevated temperature to more intimately consolidate the two component materials and improve the mechanical properties of the cable once cooled. An example of a suitable manufacturing process is disclosed in U.S. Pat. No. 5,540,990 issued to Cook et al., the disclosure of which is herein incorporated by reference.

In one embodiment the polymer composite cable may have a composition of between about 20 percent to about 80 percent HMPE, balance LCAP. In a preferred embodiment, the polymer composite cable may have a composition of between about 30 percent to 70 percent HMPE, balance LCAP. In a more preferred embodiment, the polymer composite cable may have a composition between about 40 percent to 60 percent HMPE, balance LCAP. The aforementioned compositions relate solely to the relative amounts of HMPE and LCAP. Other constituents such as coloring agents, fillers, and coatings may be employed to color the resultant cable, provide magnetic or electrical properties, increase wear life, improve performance at elevated temperatures, or enhance fusing during manufacture of the cable.

In one embodiment, the clutch posts 152, 252, and 352 adapted to be used with the polymer composition cable are made of 6061 T-6 aluminum and have an outer diameter of about 3/16 inches. The aluminum posts are tubular, being permanently bonded to posts molded in the respective elements manufactured, for example, from carbon filled polycarbonate. The clutch post 452 wrapped by the stranded stainless steel cable is larger, having an outer diameter of about 0.22 inches due to differences in flexibility of the cable and coefficient of friction between the cable and the clutch post 452 relative to the polymer cable drives.

Cable tension in each drive is on the order of about 10 pounds force. The polymer composition cable has a nominal diameter of about 0.014 inches with a breaking strength of between about 20 and 30 pounds force, although other sizes with different strengths can be used depending on the application. The cables may be wrapped around respective clutch posts typically between about 1.5 to 4 times. Automatic tensioning spring forces are on the order of about 1 to 4 pounds force. As discussed hereinabove, the number of wraps and spring force can be selected as desired, depending on the anticipated maximum cable tension to be encountered during operation of the actuator, the diameter of the clutch post, and the coefficient of friction between the cable and the clutch post, in accordance with conventionally known mathematical relationships. Additionally, other materials may be used for the clutch posts. In one embodiment, the tubular aluminum posts may be eliminated altogether, the molded post in the element being used as the clutch post at the same or a different diameter. The hardness and surface finish of the clutch post may also affect performance of the automatic tensioning device due to wear and resultant changes in the effective coefficient of friction.

As stated above, in order to reduce the cost and size of a cable drive in the haptic interface 10, while maintaining the desired force reflecting characteristics, it is desirable to use relatively small actuators and capstans to generate the desired torques and forces. By increasing the reduction ratio of a cable drive transmission, the same moment can be provided at an articulation and the same amount of force can be provided at a radially outwardly disposed extension therefrom with less power. Accordingly, cost and design complexity can generally be reduced.

For example, in the case of a single stage cable drive transmission, selected for relatively high efficiency at low cost, where the drive pulley or capstan is bounded by the envelope of the articulation, the radius of the capstan is a fundamental limit on the reduction ratio of the transmission. Accordingly, the smaller the capstan, the more efficient and less costly the cable drive transmission.

As stated hereinabove, conventional metal cables, such as stainless steel cables, fail rapidly at capstan diameter to cable diameter ratios of about 15 or lower. It has been determined, however, that a cable manufactured from tungsten exhibits unexpectedly good drive and life characteristics in this lower ratio range.

According to one embodiment of the invention, the tungsten cable has a nominal braided diameter of 0.015 inches, swaged to a final diameter of about 0.014 inches. Cable construction is 8×19 class, utilizing a 7×7 core wrapped by eight 1×19 filament strands. As known by those skilled in the art, cable or wire rope, as it is sometimes known, is designated by two figures, the first indicating the number of strands and the second, the number of wires or filaments per strand. In this embodiment, each filament is nominal 0.0008 inch diameter tungsten material, such as that used in the manufacture of light bulb filaments. This is a much smaller nominal diameter than that of stainless steel filaments which can usually only be drawn as fine as about 0.003 inches in diameter.

This particular tungsten cable has a nominal breaking strength of about 37 pounds; however, higher breaking strengths have been measured, depending on how the load is applied to the cable. For example, a breaking strength of about 42.5 pounds has been measured by grabbing the cable, and a breaking strength of about 47 pounds measured using a capstan. The cable is available from Alan Baird Industries, located in Hohokus, N.J. as manufacturer's part number ALA8908LD1.

Because the tungsten cable can be manufactured from very small diameter filaments, the cable can be quite flexible so as to tightly wrap small diameter capstans. Capstans used with a tungsten cable may have a minimum diameter less than 0.25 inches at the base of the groove. In one example, the capstan diameter is 0.175 inches at the base of the groove. The above referenced 0.014 inch cable used with a 0.175 inch capstan yields a 12.5:1 ratio. Accordingly, whereas a stainless steel cable shows signs of fraying and wear after some 750,000 cycles, a tungsten cable of the same nominal diameter subjected to the same loading and test conditions exhibits no visible signs of wear after 5,500,000 cycles. Lubrication applied to a cable will decrease fraying and wear of the cable. In one embodiment using tungsten cable, lubrication is not absolutely required, as the tungsten cable contains residual carbon resulting from hydrocarbon lubricant burned during the swaging process.

The tungsten cable can also offer certain advantages over the polymer composition cable discussed hereinabove. For example, the tungsten cable has a nominal breaking strength of 37 pounds, over twice the 17 pound breaking strength of the polymer cable. Further, the cable is relatively stiff in the longitudinal direction. Accordingly, there is near zero hysteresis during use, due in part to the swaging process which imparts a residual stress in the cable. The tungsten cable also is contemplated to exhibit negligible creep over the useful life of the cable, based on observations during the aforementioned cyclic testing.

The tungsten cable also grips clutch posts and capstans securely, due to the surface characteristics of the cable. Accordingly, the cable may be used with or without the grounded capstans discussed hereinabove with respect to FIGS. 3A and 3B, as well as with or without metal sleeves on the clutch posts. Also, the cables can be manufactured to accurate lengths, for example within a tolerance of about plus or minus 0.03 inches for a 15 inch cable, for example, by crimping the ends to form loops for attachment to the transmission elements. The tungsten cable is also quite stable at elevated temperatures of 200° F. or higher, which can occur in haptic interfaces.

Accordingly, a tungsten cable can be used advantageously in a haptic interface transmission drive to achieve the benefits of each of standard stainless steel cables and the above described polymer composition cables, without the inherent shortcomings of each. One embodiment uses tungsten cables in the first and second axis drives and a portion of the third axis transfer drive.

Referring now to FIG. 4A, depicted is a schematic perspective view of the transfer drive, shown generally at 74, for powering the third articulation 26 of the haptic interface 10 in accordance with one embodiment of the present invention. FIG. 4B is a schematic perspective view of the actuator end of the transfer drive 74 depicted in FIG. 4A. Several covers of the haptic interface elements have been removed to expose the components.

Mounted on the first element 14 are second axis actuator 76 and third axis actuator 78. The first axis actuator is disposed in the housing 12 and cannot be seen in this view; however, the capstan 156 thereof is partially visible. As the capstan of the third axis actuator 78 rotates, the transfer drive element 58 rotates about second axis B, converting rotary motion to linear motion of first and second transfer drive rods 60, 80 disposed along the radial extension 24 of the second element 18. As best seen in FIG. 4A, the drive rods 60, 80 terminate in looped braided tungsten or stranded stainless steel cable ends which are hooked onto a raised ground tab of the third element 22.

Accordingly, the second transfer drive rod 80 is directly grounded through looped cable ends to each of the drive element 58 and the third element 22; whereas, the first drive rod 60 is directly grounded through a looped cable end to the third element 22 and indirectly grounded to the drive element 58 through the clutch post 452 and spring 454 depicted in FIG. 2E. The drive rods 60, 80 minimize cable lengths and therefore enhance the stiffness and rigidity of the transfer drive 74. The cables are used solely at the grounding points, with one cable end of the first drive rod 60 being routed through the automatic cable tensioning device 446 depicted in FIG. 2E to substantially eliminate backlash in the third axis drive. The tension achieved with the automatic cable tensioning device also provides added stiffness and rigidity in the drive system.

Referring again to FIG. 4B, it can be seen that by nesting the transfer drive 58 and the second element 18 commonly on the second axis B, a significant portion of the mass and weight of the third axis cable drive is supported directly by the first element 14, instead of being cantilevered out at the end of the extension 24 of the second element. As a result, the imbalance of the second element 18 due to the radial extension 24, as well as the weight of the third element 22, fourth element 28, fifth element 34, and stylus 40, can be readily counterbalanced using a circumferentially loaded spring 82 disposed concentrically with the second axis B. A counterweight 164, rigidly attached to member 18 can be used to assist the spring 82 in counterbalancing those elements which rotate about the second axis B. A counterweight 166, rigidly attached to transfer drive element 58 moves with element 58 in a manner that counterbalances the motion of remotely located members such as the third element 22, fourth element 28, fifth element 34, and stylus 40 as they move about axis C.

Further, FIG. 4B depicts the substantial structural ribbing of the interior portion of the second element 18, especially the extension 24 thereof. The haptic interface 10 is designed such than the elements themselves provide the structural integrity or skeleton of the interface 10, rather that having mechanical frames and the like merely encased in cosmetic covers. Accordingly, the skeleton of the interface may be considered as an exoskeleton, with the cable drives, articulation bearings, and other transmission components attached thereto.

Light weight, low cost, high stiffness, and high strength are preferred characteristics for the moveable portions of the haptic interface. For these reasons, injection molded 40% carbon fiber filled nylon or similar compositions may be selected for the structural elements such as second element 18, second element extension 24, third element 22, third element extension 30, fifth element 34, and sixth element 40. Other glass and carbon fiber filled, injection molded plastics may be used as well. Desirable characteristics for the base portion, or housing 12, of the haptic interface also include low cost, high strength, and high stiffness; however, because the base structure may also serve as a heat sink for the internal electronics, it is desirable that the base structure be significantly thermally conductive. Finally, to avoid the requirement of rigidly attaching the haptic interface to a desktop or otherwise grounded surface, the haptic interface should have enough weight to prevent movement during the application of forces to a user. For these reasons, a plaster cast or die cast zinc material may be used in the construction of the housing 12. Other suitable materials include cast iron, bronze, and aluminum.

Figure 5:
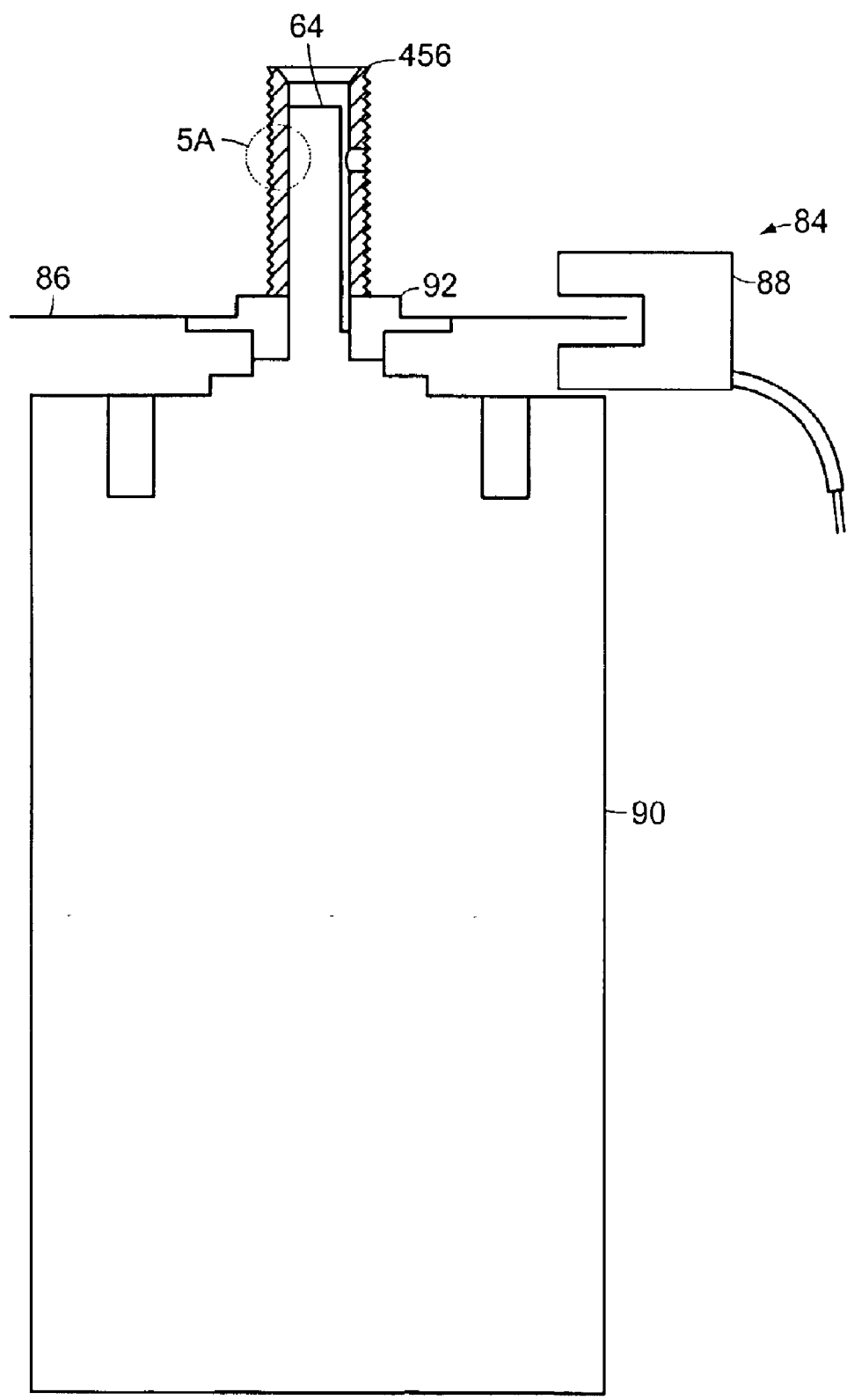
FIG. 5 is a schematic side view of an actuator with an encoder disposed proximate the cable drive capstan for use in the haptic interface in accordance with an embodiment of the present invention.

In order to track the location of the powered axes, each of the actuators is fitted with an optical encoder 84 having an encoder disk 86 and an emitter/detector pair 88 as depicted in FIG. 5. Instead of conventionally tracking actuator rotation by mounting the encoder disk 86 on a shaft extension extending from the actuator 90 remote from the capstan 456, the encoder disk 86 is mounted on the actuator shaft 64 using a collar 92 disposed proximate the capstan 456. Accordingly, the overall volume required for the actuator 90 in the haptic interface 10 can be minimized for a given size actuator 90. The emitter/detector pair 88 straddles an edge of the disk 86, outputting pulses as the shaft 64 and disk 86 rotate so that the angular orientation of the powered articulation can be determined.

The haptic interface 10 may include automatic work volume calibration components for use in combination with computer software such that the haptic system, as a whole, has the capability to initialize position of the haptic interface 10 when the system is energized and geometrically center the user reference point in both the workspace volume and virtual or remote environment.

As mentioned hereinabove, each of the actuators for axes A–C includes an encoder 84 for tracking the angular orientation of the first element 14, second element 18, and third element 22. Since the relative encoders, however, provide indications of relative angular rotation, an absolute reference is needed to define a "home" position for each element. As best seen in FIG. 4B, the second element 18 includes three axially disposed flags 94a–c forming gaps 95a–c having different circumferential lengths. As the second element 18 is rotated about axis B, either manually by a user or under system control by the second axis actuator 76, the flags 94a–c and gaps 95a–c sequentially pass through an emitter/detector pair 96. Based on the number of encoder pulses counted during passage of any given flag 94 or gap 95 through the emitter/detector pair 96, the specific flag 94 or gap 95 and angular orientation of the second element relative to the home position can be determined.

In one embodiment, the first element 14 and second element 18 each have three flags and the third element 22 solely one, due to space constraints. Although one flag or gap is sufficient, a plurality of flags and gaps with different lengths located at several circumferential locations permits determining the absolute angular orientation of the element more readily, with lesser manual or automatic angular rotation of the element being required. The angular location of each of the fourth element 28, fifth element 34, and sixth user connection element or stylus 40 about respective axes D–F may be tracked using respective potentiometers.

When the haptic interface system is energized, a user can be directed to manually move the stylus 40 and connected elements through respective ranges of motion within the work volume of the haptic interface 10 to geometrically calibrate the workspace. Alternatively, under control of system software, the three actuators may be used to automatically drive the powered axes through their range of motion to achieve a similar result. In addition, the system may adjust itself through monitoring during normal use to compensate, for example, for system wear or cable stretch. Instead of using an optical emitter/detector pair 96, other devices such as a microswitch or proximity switch could be used. Alternatively, potentiometers or absolute encoders may be employed as a substitute for, or in addition to, the relative encoders for measuring the absolute position of the rotary axes of the device.

The user connection element or stylus 40 of the haptic interface 10 may include a detector 100 for detecting the presence of a user, according to one embodiment of the invention. FIG. 6 depicts a cross-sectional view of one embodiment of the stylus 40 which includes the presence detector 1 00. The presence detector 100 determines whether a portion of a user's body is physically contacting the stylus 40. The stylus may also include a mechanical push-button switch 98 actuated by squeezing the stylus 40 proximate thereto for other control purposes.

The presence detector 100 includes an electrically conductive portion 102, circuitry 104, and a connector 106 which electrically couples the conductive portion 102 to the circuitry 104. The conductive portion 102 shown in FIG. 6 extends along an axial and circumferential portion of an external surface 108 of the stylus 40 which is typically contacted by a user when grasping the stylus 40. In other embodiments, the conductive portion 102 may extend along shorter or longer portions of the surface 108 in both axial and circumferential directions. In yet another embodiment, the conductive portion 102 may envelop substantially the entire external surface 108 of the stylus 40. The conductive portion 102 may be composed of any material which conducts electricity. In one embodiment, the conductive portion 102 is composed of conductive rubber.

The circuitry 104 is electrically coupled to the conductive portion 102 by the connector 106. The connector 106 shown in FIG. 6 is a spring contact which presses against an interior surface of the conductive portion 102. The circuitry 104 is arranged on a printed circuit card which is in electrical communication with a main circuit board of the haptic interface 10 disposed, for example, in the housing 12. The circuitry 104 detects the capacitance of the user's body relative to electrical ground.

Figures 7, 7A:
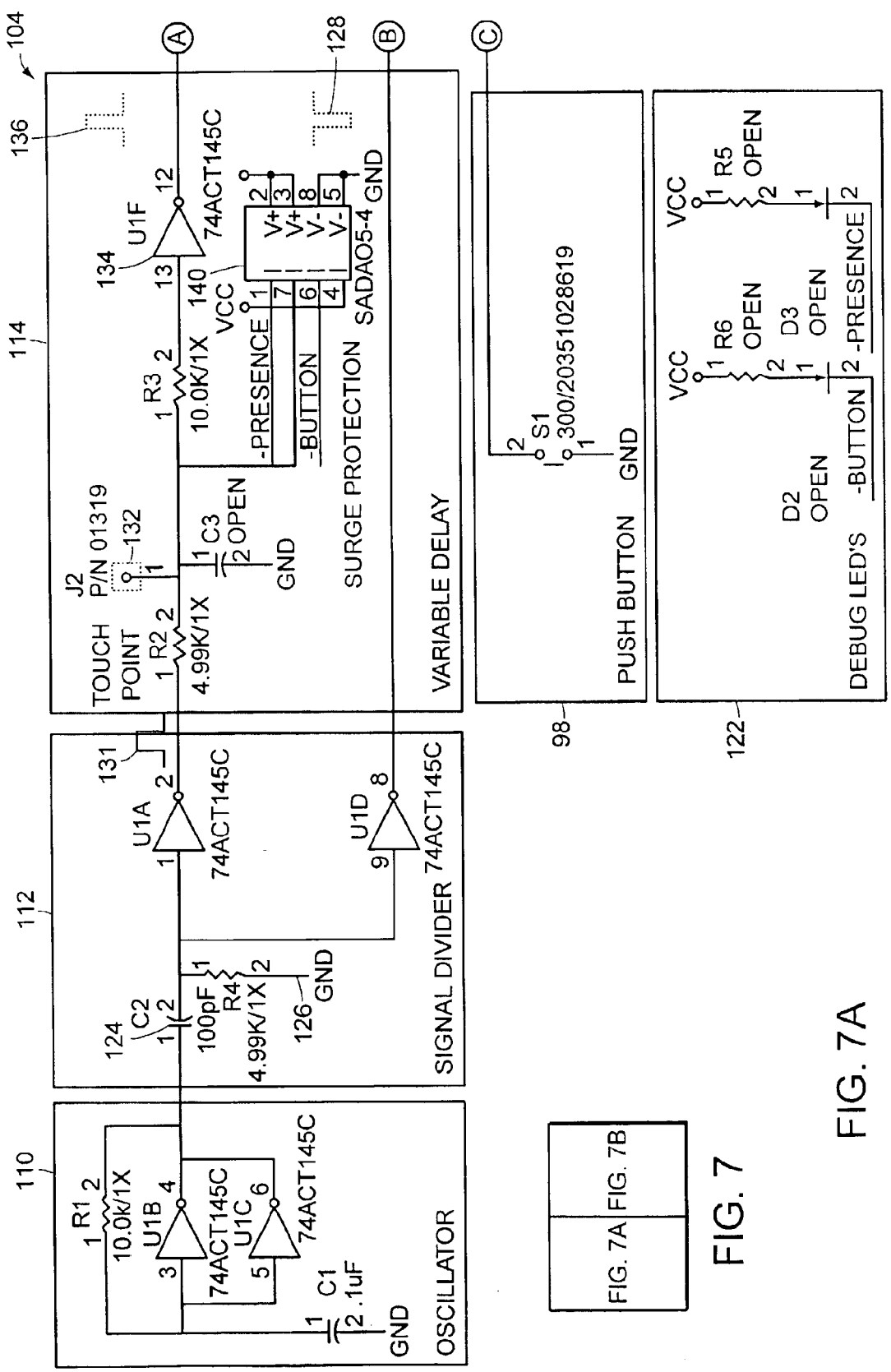
FIG. 7 is a schematic of a portion of the circuit board disposed in the stylus depicted in FIG. 6, including the presence switch circuitry.
Figure 7B:
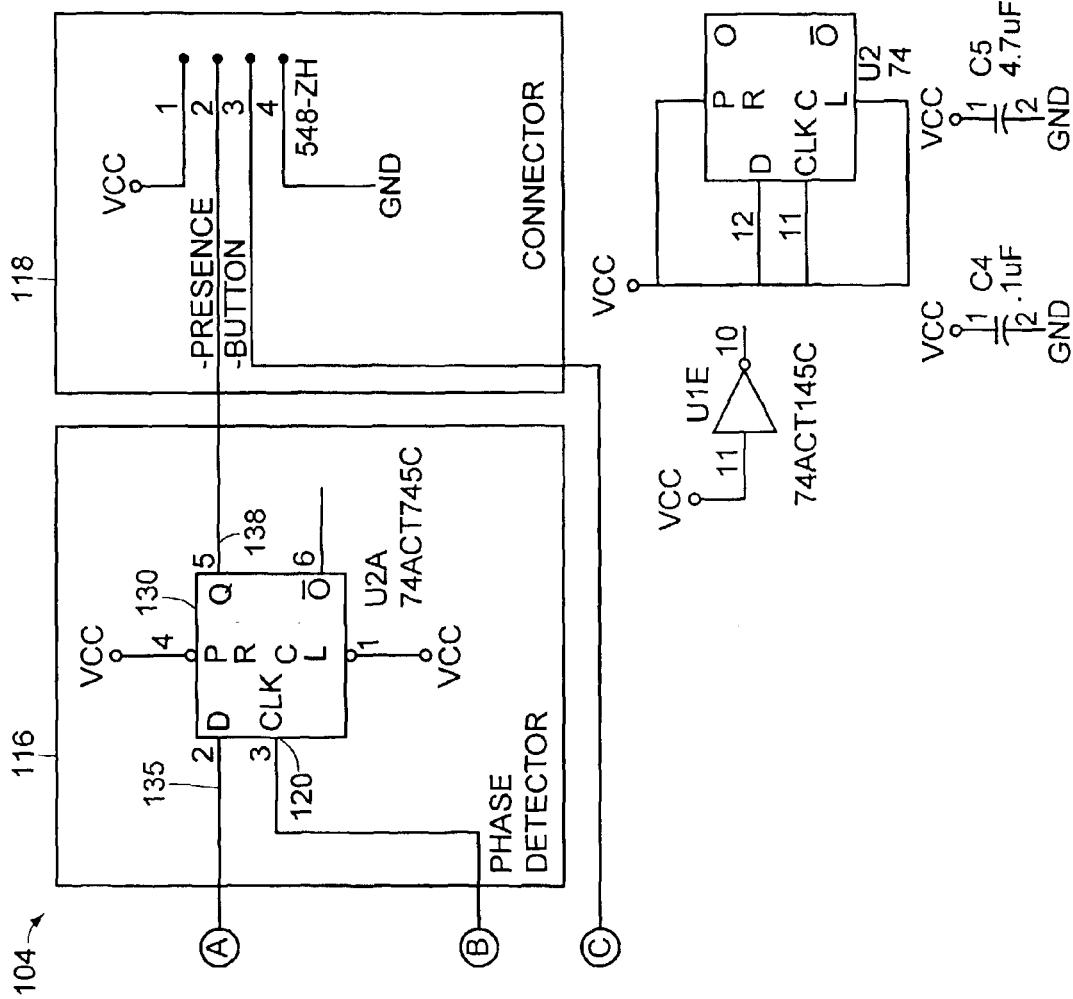

Referring to FIG. 7, the circuitry 104 includes an oscillator 110, a signal divider 112, a variable delay 114, a phase detector 116, a connector 1 18, the push-button switch 98, and light emitting diodes 122. The oscillator 110 generates a signal which is input to the signal divider 112. A capacitor 124 and a resistor 126 of the signal divider 112 generate two pulses. A first pulse 128 is received by a clock input terminal 120 of a flip-flop 130 of the phase detector 116 and a second pulse 131 is received by the variable delay 114. The variable delay 114 has an input terminal 132 which is electrically coupled to the conductive portion 108 by the connector 106. The variable delay 114 delays the second pulse 131 from reaching the phase detector 116. If the user is contacting the conductive portion 108, the capacitance of the user changes the capacitance of the variable delay 114 and delays the second pulse 131. A Schmitt trigger 134 operates to square up the second pulse 131 into a square wave pulse 136 which is received by a D input terminal 135 of the flip-flop 130. The amount that the pulse 131 is delayed depends on the capacitance of the user.

In the embodiment shown in FIG. 7, the input to the D terminal 135 of the flip-flop 130 will be high or asserted if the user is not contacting the conductive portion 108. If the user is contacting the conductive portion 108, the pulse 136 is shifted to the right and the input to the D terminal 135 of the flip-flop 130 will be low or unasserted. The flip-flop 135 outputs a signal at a Q terminal 138 thereof which indicates the presence or absence of a user. This signal is read by the system computer which may enable or disable the haptic interface 10 or take other actions based on this signal. In one embodiment, the haptic interface 10 upon detecting the absence of the user will actively maintain its last orientation so that the user may later conveniently re-grasp the device at the same location.

In one embodiment, the variable delay 114 includes a surge protector 140. The surge protector 140 protects the circuitry of the variable delay 114 from surges of electricity, such as sparks of static electricity which may come into contact with the conductive portion 108.

Velocity limits may be provided for each of the powered axes to safely limit the speed of axes A–C in the event of a system programming error or system malfunction. In one embodiment, the velocity limits may be implemented using computer hardware, for example, by providing for maximum actuator rotational speed limits for each of the axes in an integrated circuit or otherwise. These maximum actuator speeds are typically different, due to the different geometric and mechanical configuration of each powered axis. In the event the limit is exceeded for one or more axes, the system may dynamically brake the actuators electrically to slow the errant axis or otherwise disable the axis. In the embodiment where the actuators are DC motors, the actuators can be effectively braked by shunting the inputs to the motors. Velocity limits may be implemented in system software, either redundantly in addition to the hardware limits, or alternatively. If used in a redundant system, these software limits may be implemented advantageously at levels slightly below those of the hardware limits so that they are triggered first.

Figure 8A:
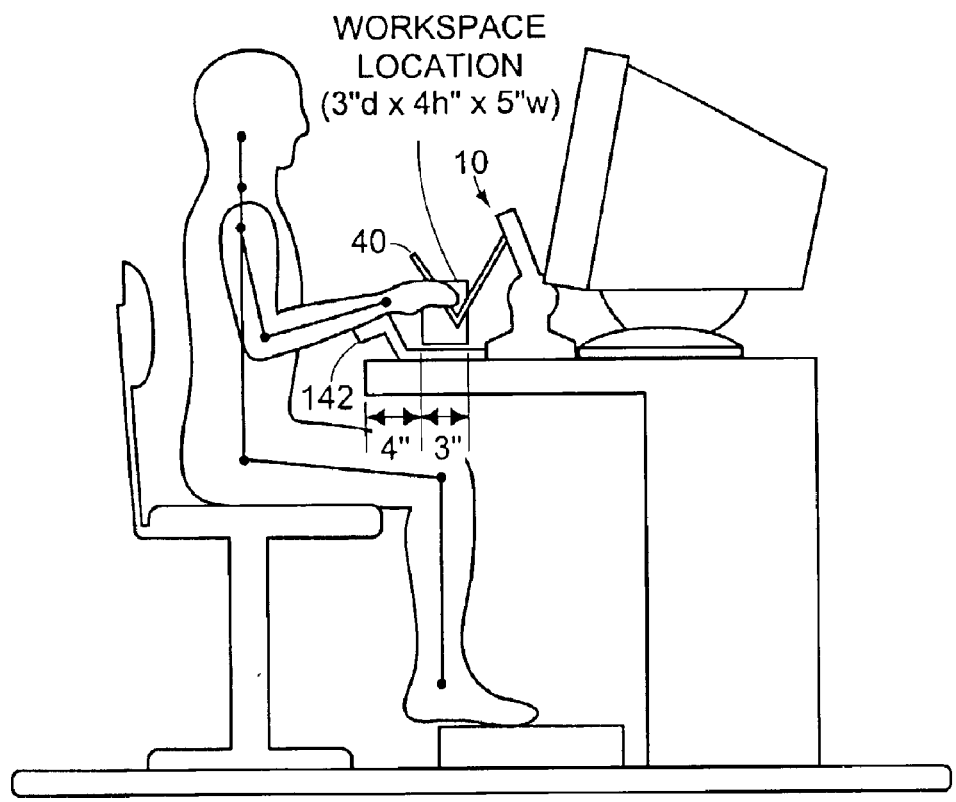
FIG. 8A is a schematic side view of an ergonomic representation of a user employing the haptic interface in combination with a wrist rest in a desktop environment.
Figure 8B:
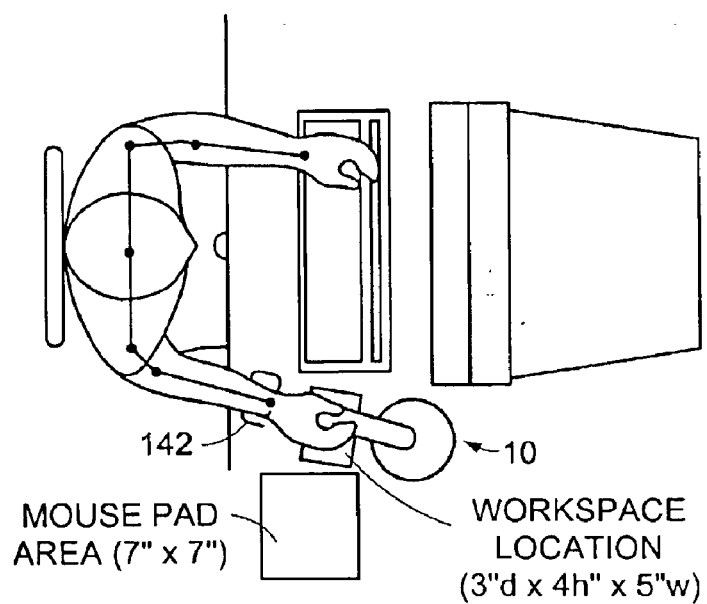
FIG. 8B is a schematic top view of the ergonomic representation depicted in FIG. 8A.
Figure 9A:
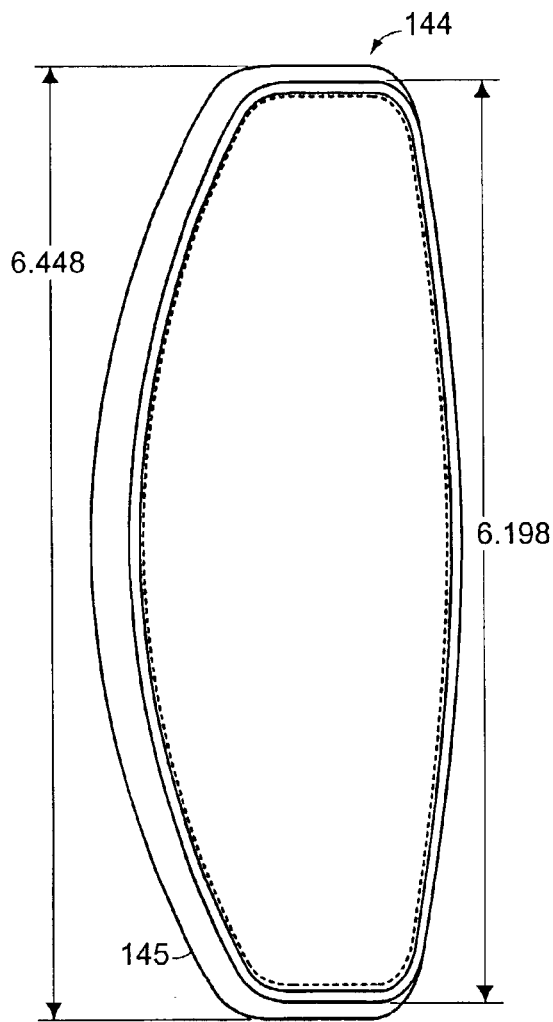
FIGS. 9A–9D are schematic top, side, end section, and partial section views of a wrist rest for use in combination with the haptic interface in accordance with an embodiment of the present invention.
Figure 9B:
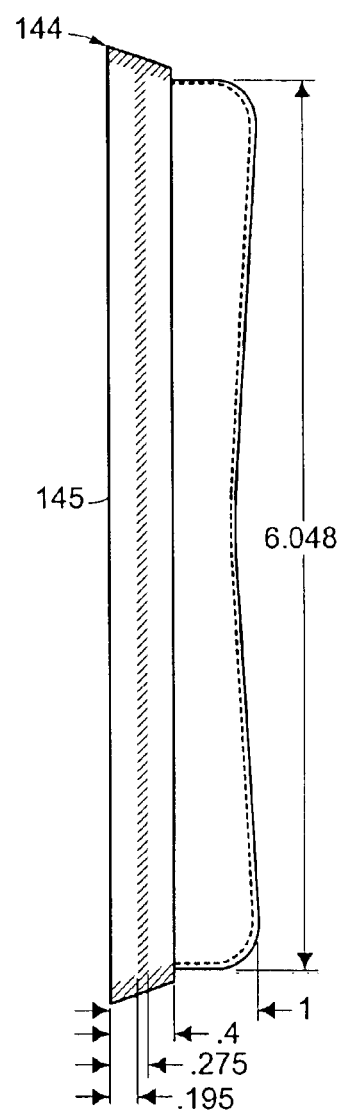
Figure 9C:
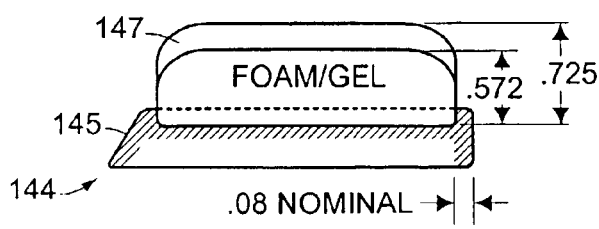
Figure 9D:
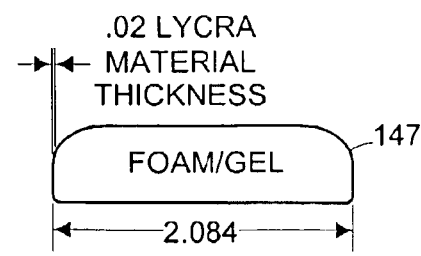

A wrist rest or other structure may be provided to support a user's wrist and/or arm at a predetermined or adjustable height and orientation to address ergonomic concerns with prolonged or extended use of the haptic interface. As used herein, the term wrist should be considered to refer to any area of a user's arm, from the palm to the elbow, inclusive. FIG. 8A is a schematic side view of an ergonomic representation of a user employing the haptic interface 10 in combination with a wrist rest 142 and other system components in a desktop environment. FIG. 8B is a schematic top view of the ergonomic representation depicted in FIG. 8A. By elevating a user's wrist so as to position the user's hand generally within the center or upper portion of the work volume of the haptic interface 10, the forearm and wrist may be maintained in a natural, neutral orientation for comfortably grasping and manipulating the stylus 40. Naturally, if the user connection element were a thimble or other structure designed to be donned or grasped by the user in a different orientation, the height and orientation of the wrist rest 142 could be made adjustable. As depicted herein, the wrist rest 142 is connected to the haptic interface 10, although a separate stand alone wrist rest with appropriate height and orientation could be used. The haptic interface is disposed advantageously proximate a system keyboard within easy reach of a user, typically inboard of a mouse pad area.

FIGS. 9A–9D are schematic top, side, end section, and partial section views of a contact pad 144 for use in the wrist rest 142 for use in combination with the haptic interface in accordance with an embodiment of the present invention. The contact pad 144 may include a structural tray 145 for supporting a gel and/or foam material optionally encased, wholly or partially, in a natural or synthetic fabric, skin, or other covering 147. In one embodiment, a soft silicone gel may be used. The surface of the contact pad adapted to support the user's wrist may be substantially planar, concave, or convex in any direction. The dimensions shown in FIGS. 8A–8B and 9A–9D are merely exemplary in nature. Actual dimensions may be varied, as necessary to accommodate a particular haptic interface configurations, orientation, and work volume.

While there have been described herein what are to be considered exemplary and preferred embodiments of the present invention, other modifications of the invention will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the invention. Accordingly, what is desired to be secured by Letters Patent is the invention as defined and differentiated in the following claims.

What is claimed is:

1. A user connection element for a force reflecting haptic interface, the user connection element comprising a presence detector comprising:
   (i) an electrically conductive portion for contacting a user;
   (ii) an electrical circuit; and
   (iii) a connector for electrically coupling the conductive portion with the electrical circuit, wherein upon contacting the electrically conductive portion, a capacitance of the user affects the electrical electrical circuit, wherein the electrical circuit detects a change in capacitance relative to ground due to contact by the user.

2. The user connection element of claim 1, wherein the user connection element is a stylus.

3. The user connection element of claim 1, wherein the electrically conductive portion for contacting a user comprises a conductive rubber.

4. The user connection element of claim 1, wherein the electrically conductive portion envelops substantially an entire external surface of the user connection element.

5. The user connection element of claim 2, wherein the electrically conductive portion extends along an axial and circumferential portion of an external surface of the stylus.

6. The user connection element of claim 1, wherein the connector comprises a spring contact which is biased against an interior surface of the electrically conductive portion.

7. The user connection element of claim 1, wherein the electrical circuit comprises:
   an oscillator for generating a signal;
   a signal divider for receiving the signal and generating a first and a second pulse;
   a phase detector for receiving the first pulse; and
   a variable delay for receiving the second pulse and including an input terminal electrically coupled to the electrically conductive portion, wherein the variable delay delays the second pulse an amount of time before reaching the phase detector when a user is contacting the electrically conductive portion.

8. The user connection element of claim 7, wherein the amount of time of the delay depends on the change in capacitance.

9. The user connection element of claim 7, wherein the user connection element outputs a signal to enable operation of the haptic interface.

10. The user connection element of claim 7, wherein the variable delay includes a surge protector.

11. The user connection element of claim 1 further comprising a switch connected to at least one of the first electrical circuit and a second electrical circuit.

12. The user connection element of claim 11, wherein the switch is actuated by squeezing.

13. The user connection element of claim 1, wherein the user connection element maintains a last orientation upon detecting an absence of a user.

14. The user connection element of claim 1 further comprising a light emitting diode connected to at least one of the first electrical circuit and a second electrical circuit.

15. The user connection element of claim 1, wherein the force reflecting haptic interface comprises six degrees of freedom.

16. The user connection element of claim 15, wherein at least three degrees of freedom are powered.

17. The user connection element of claim 15, wherein at least three degrees of freedom are free.

18. The user connection element of claim 1, wherein the force reflecting haptic interface comprises:
  a housing defining a reference ground; and
  a series of six structural elements disposed between the housing and a user forming a kinematic chain, wherein:
  a first three elements are located in the kinematic chain proximate the housing;
  a second three elements are located in the kinematic chain distally from the housing; and
  the user connection element comprises the sixth structural element in the kinematic chain.

* * * * *

UNITED STATES PATENT AND TRADEMARK OFFICE
CERTIFICATE OF CORRECTION

PATENT NO. : 6,879,315 B2
DATED : April 12, 2005
INVENTOR(S) : Rodomista et al.

It is certified that error appears in the above-identified patent and that said Letters Patent is hereby corrected as shown below:

Title page,
Item [12], "Guy et al." should be deleted and replaced with -- Rodomista et al. --.
Item [75], Inventors, "Rodomista Guy" should be deleted and replaced with -- Guy Rodomista --, "Ziegler Andrew" should be deleted and replaced with -- Andrew Ziegler --, and "Bolton Clive" should be deleted and replaced with -- Clive Bolton --.

Column 16,
Line 14, "an" should be deleted and replaced with -- a first --.
Line 18, the second "electrical" should be deleted in its entirety.
Line 46, the "the" in the phrase "on the change in capacitance," should be deleted and replaced with -- a --, such that the phrase reads "on a change in capacitance.".

Signed and Sealed this

Twentieth Day of September, 2005

JON W. DUDAS
*Director of the United States Patent and Trademark Office*